US006842526B2

(12) United States Patent
Walker

(10) Patent No.: US 6,842,526 B2
(45) Date of Patent: Jan. 11, 2005

(54) ADAPTIVE NOISE LEVEL ESTIMATOR

(75) Inventor: Michael Walker, Baltmannsweiler (DE)

(73) Assignee: Alcatel, Paris (FR)

( * ) Notice: Subject to any disclaimer, the term of this patent is extended or adjusted under 35 U.S.C. 154(b) by 467 days.

(21) Appl. No.: 09/973,828

(22) Filed: Oct. 11, 2001

(65) Prior Publication Data

US 2002/0064288 A1 May 30, 2002

(30) Foreign Application Priority Data

Oct. 24, 2000 (DE) ........................................ 100 52 626

(51) Int. Cl.[7] .......................... H04B 15/00; G10L 21/02
(52) U.S. Cl. ...................................... 381/94.1; 704/226
(58) Field of Search .......................... 381/94.1; 704/226

(56) References Cited

U.S. PATENT DOCUMENTS 3,855,423 A * 12/1974 Brendzel et al. ............ 708/323
4,000,369 A * 12/1976 Paul et al. .................. 704/228
4,885,790 A * 12/1989 McAulay et al. ........... 704/265

* cited by examiner

*Primary Examiner*—Minsun Oh Harvey
*Assistant Examiner*—Devona E Faulk
(74) *Attorney, Agent, or Firm*—Sughrue Mion, PLLC

(57) ABSTRACT

A process for determining an estimated value for the noise level n of a background noise superimposed on an acoustic useful signal is characterized in that the estimated value n(x) for a sampled input signal x(k) is defined as a value n1(x) which is determined by means of the minimum value of the quantity of all the successive maximum values of the input signal x(k) in each case found within a short time interval ts≧1 ms; that the value n1(x) is adopted as estimated value n(x) for the current noise level n when the dynamic variations of the input signal x(k) undershoot a threshold value ∈; and that otherwise the estimated value determined in the preceding step is adopted unchanged as new estimated value n(x). In this way it is possible to achieve an extremely exact determination of the current noise level with very fast adaptation times which are considerably shorter than in known processes, with the need for only a relatively small computation outlay.

11 Claims, 1 Drawing Sheet

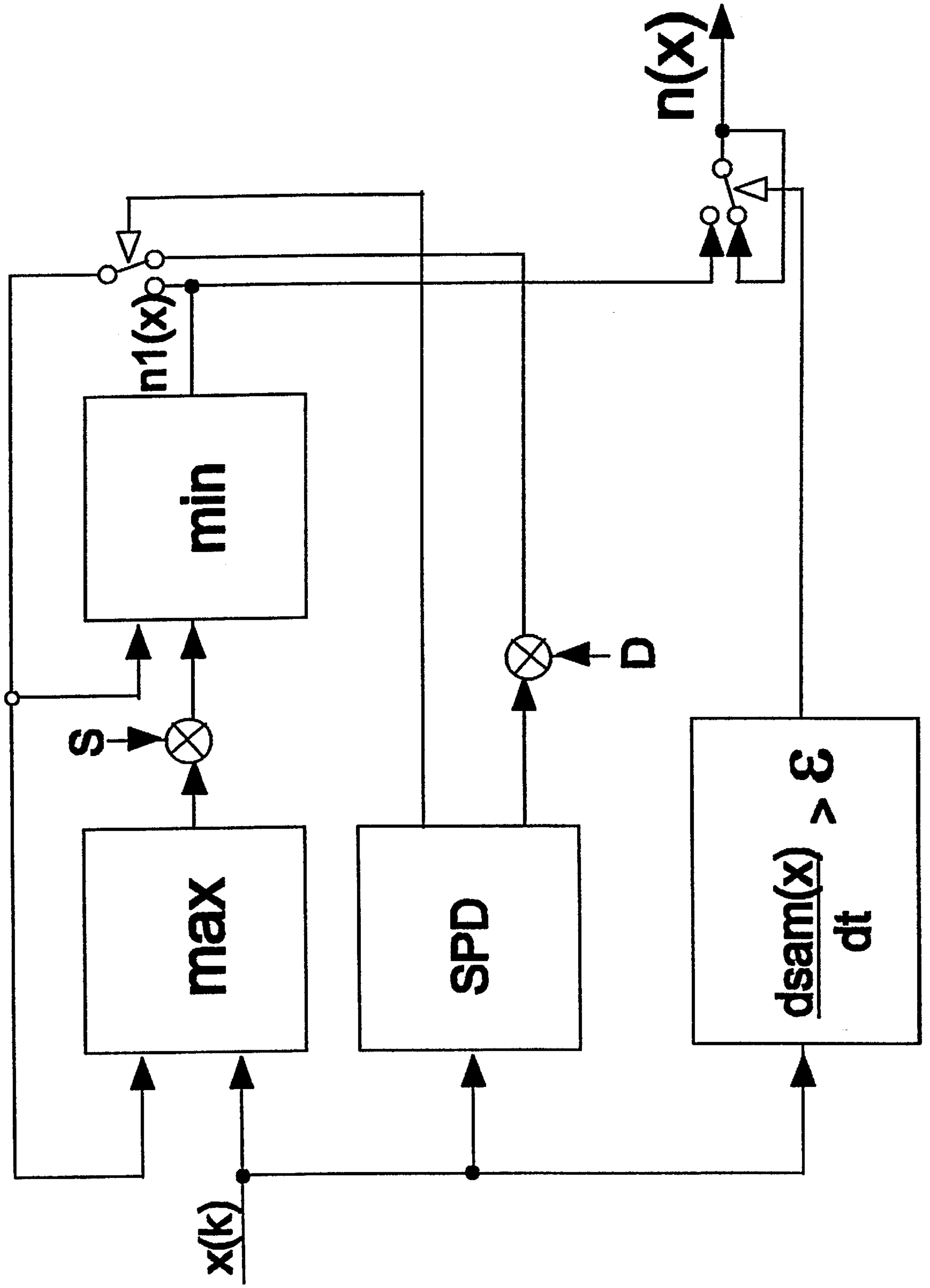
n(x)
n1(x)
min
max
SPD
S
D
x(k)
dsam(x)/dt > ε

ADAPTIVE NOISE LEVEL ESTIMATOR

BACKGROUND OF THE INVENTION

The invention relates to a process for determining an estimated value for the noise level n of a background noise which is superimposed on an acoustic useful signal, in particular a human speech signal, transmitted via a telecommunications (=TC) system. The invention further relates to computer programs and devices for supporting and executing such a process, in particular suitable server units, signalling equipment, processor modules and programmable gate array modules. The invention is based on a priority application DE 100 52 626.8 which is hereby incorporated by reference.

Processes for the noise estimation of background noises are known. For example noise estimators are used in which, for the estimation of the noise level of a signal, the value of the signal averaged in a short time interval (SAM=short average magnitude) is used.

In other processes the so-called MAM (=medium average magnitude) value of an input signal is measured in longer time intervals. To achieve a reliable estimation result, measurement times up to 500 ms are required. Often the MAM value also simulates too high a noise level compared to the actual noise level.

In general the value of the noise level of a signal is of great importance for many signal processing algorithms as threshold value or control value. The reliability and time response of a noise estimator have a large influence on the attainable quality of a signal processing algorithm. This applies in particular to the field of speech recognition for improving the recognition rate, to the field of echo suppression and to noise reduction. Application areas for noise estimators are for example switching systems, conference equipment as well as conventional telephones or hand-held devices.

A disadvantage of known estimating processes is the relatively long response of the averaging in the noise estimator. Especially in the case of speech activity with only short speech pauses at time intervals of <100 ms, often the time is insufficient to detect the "noise base".

In accordance with the ITU-T guide line G.168, so-called composite signals are used consisting of a sequence of signal bursts with a pause time of approximately 100 ms. Here again, exact noise estimation is not possible with the previously known processes.

Another problem associated with the noise threshold is noise updating under environmental conditions which change over time as performed in successful speech level estimation. The estimated noise value thus fluctuates within specific, often relatively large, limits.

SUMMARY OF THE INVENTION

By way of comparison, the object of the present invention is to further develop a process of the type described in the introduction with the simplest possible means, such that the current noise level is determined as exactly as possible with the fastest possible adaptation times which are considerably shorter than in known processes, and that the smallest possible computation outlay is required for this purpose.

In accordance with the invention, this object is achieved in an equally surprisingly simple and effective manner in that in a first step a predeterminable initialisation value n0 is adopted as estimated value n(x) for a current noise level n;

that in the next step and optionally in further steps the estimated value n(x) of the noise level n for an input signal x(k), sampled in preferably equidistant time steps T in each case at times k with a sampling frequency fs=1/T, is defined as a value n1(x) which is determined by means of the minimum value of the quantity of all the successive maximum values of the input signal x(k) in each case found within a short time interval with a time length ts≧1 ms, preferably ts≧3 ms; that the value n1(x) is adopted as estimated value n(x) for the current noise level n when the dynamic variations of the input signal x(k) undershoot a predeterminable threshold value ∈; and that the estimated value n(x) determined in the preceding step is adopted unchanged as new estimated value n(x) for the current noise level n when the dynamic variations of the input signal x(k) exceed a predeterminable threshold value ∈.

Thus with the process according to the invention, in each case in a short time interval of the length ts, a maximum value of the sample values of the input signal x(k) is determined, and for the estimation of the current noise level from the quantity of a plurality of serially found maximum values the minimum n1(x) is in each case used as estimated value n(x) for the current noise level n. To make available an estimated value n(x) actually before the first measurement period, an initialisation value n0 is predefined.

If the dynamic variations of the input signal, caused in particular by large changes in the noise background, such as for example the slamming of a door, the passing of a lorry etc., exceed a specific predeterminable threshold value ∈, the estimating process is as it were "halted" and the last estimated value for which the dynamic response of the input signal x(k) was below the predetermined threshold value ∈ is in each case adopted. This prevents the occurrence of erratic estimated values due to rapid fluctuations in the signal. Thus the process according to the invention achieves an extremely fast adaptation to the current noise level in time periods of approximately 10 ms, in contrast to the above mentioned known processes which require times in the order of magnitude of 500 ms for this purpose.

It will be apparent that in particular the process according to the invention also facilitates a correct calculation in the case of the use of the above mentioned G168 composite signals with exact determination of the noise level and very fast adaptation times with an extremely low computation outlay.

A particularly preferred embodiment of the process according to the invention is that in which the time interval ts=1/fug is selected, where fug is the lower limit frequency of the transmitting TC system. In this way the envelope curve of the input signals can be optimally followed.

In particular, the time length ts is in each case to be selected such that an adaptation of low-frequency signals in the range<100 Hz is precluded. Normally the lower limit frequencies are in a range fug≦500 Hz. In conventional telephony systems the lower limit frequency is 330 H for example. A value of approximately 10 Hz as lower limit for the lower limit frequency fug corresponds to the value of a conventional hifi amplifier and is therefore sensible.

A variant which is advantageous for the execution of the process according to the invention is that in which the maximum representable value of the destination system for the signal transmission within the TC system is selected as initialisation value n0.

Another advantageous variant of the process according to the invention is characterised in that for the determination of the estimated value n(x), the value n1(x) is set at a predeterminable or fixed lower limit value $n_{min}$ if a value n1(x) $<n_{min}$ is determined. In this way misestimations are reliably prevented in a simple manner, thereby resulting in a higher degree of accuracy of the estimated value due to the range limitation.

This also applies in respect of an upper limit to be introduced in order to ensure distortion-free signal transmission. Accordingly, in a further variant of the process according to the invention it is provided that for the determination of the estimated value n(x), the value n1(x) is set at a predeterminable or fixed upper limit value $n_{max}$ if a value $n1(x)>n_{max}$ is determined.

A particularly preferred further development of this process variant is that in which the upper limit value $n_{max}$ is selected to be smaller than or equal to the initialisation value n0, preferably $n_{max} \leqq n0-16$ dB. For a linear, distortion-free signal transmission in the relevant TC system, this upper limit value is predefined by the statistically determined speech dynamics of human speech.

Another advantageous embodiment of the process according to the invention provides that the maximum values, found within the short time intervals, of the input signal x(k), multiplied by a scaling factor S<1, enter into the determination of the value n1(x). The plurality of actual level values thus actually is below the maximum value in each case determined within the relevant short time interval.

If the scaling factor $S \cong 0.5$ is selected, this corresponds approximately to the position of the maximum value of a statistical distribution, for example a Gaussian distribution, of the sample values relative to the position of the found, maximum level value. In this way the actual current noise level n on average is found considerably more easily than through the use of the unscaled maximum value.

For applications of the process according to the invention for reliable speech pause detection, it is advantageous to scale the estimated value n(x) as a gauge of a currently estimated noise level with a factor D>1.

By simulation, values in the range $2 \leqq D \leqq 5$, preferably $3 \leqq D \leqq 4$, were found as favourable values for the factor D depending upon the application. This also results in a spacing of approximately 6 dB between the speech signal and the statistically determined noise signal, which generally applies as acceptable signal-to-noise ratio.

Another particularly preferred embodiment of the process according to the invention is that in which a fixed threshold value $\in$=const. is set, preferably $\in \approx 12$ dB. Most practical applications can be well covered with this value obtained by simulation.

Alternatively to introducing a fixed threshold value $\in$, in another advantageous process variant the threshold value $\in = \in(x)$ can be adaptively changed with the roughness of the level of the input signal x(k). Optimal and extremely fast updating and adaptation of the estimated level value to the actual noise conditions can be achieved in this way.

Advantageously, in a further development of this process variant, a start value $\in 0=12$ dB can be selected for the threshold value $\in(x)$ to be adaptively determined, as proposed as invariable fixed value in the above described alternative process variant.

The scope of the present invention also includes a server unit, a processor module and a gate array module for supporting the above described process according to the invention and a computer program for the execution of the process. The process can be implemented either as a hardware circuit or in the form of a computer program. At the present time software programming for high-power DSPs is preferred, as new findings and additional functions can be more easily implemented by changing the software on an existing hardware basis. However processes can also be implemented as hardware modules, for example in IP or TC terminals or in conventional telephone systems.

Further advantages of the invention will become apparent from the description and the drawing. Equally the above described features and the features to be described in the following can be used in accordance with the invention either individually or jointly in any combinations. The illustrated and described embodiments are not to be considered as a final specification, but rather are by way of example for the description of the invention.

BRIEF DESCRIPTION OF THE DRAWINGS

The invention is illustrated in the drawing and will be explained in detail in the form of exemplary embodiments.

The FIGURE is a highly schematised fundamental diagram of the mode of operation of an estimating device for the execution of the process according to the invention.

Commencing from an initialisation value n0, in a first short time interval of the time length $ts \geqq 1$ ms, from a sampled input signal x(k), a first estimated value n1(x) for the noise level n of a background noise superimposed upon a useful signal in the input signal x(k) is calculated in accordance with the following equation:

$$nl(x) = \min\left\{\max_{k=0}^{K}[S \cdot (|x(k)|, \ldots, |x(k-K)|]; nl(x)\right\} \tag{1}$$

where K=fs/fug is the quotient of the sampling frequency of the sampled input signal x(k) and of the lower limit frequency fug of the transmitting TC system. The length of the short time interval is ts=1/fug. In this way the shortest time interval which must be observed to prevent adaptation to low-frequency signals is represented over the time index k.

The value n1(x) is thus obtained from the minimum of a preceding value n1(x) or an initialisation value n0 and from the maximum value of the values of the input signal x(k), scaled with the scaling factor $S \approx 0.5$, in the interval k=0 to k=K.

In the event that speech activity is present in the input signal x(k), a value dependent upon the speech level is adopted as value n1(x) as the speech level is in fact louder than the noise. A signal-to-noise ratio of 6 dB is acceptable for example.

Although the thus found value n1(x) still changes with the speech, it reacts to noise reduction and during speech pauses with an extremely short adaptation time.

The above described value n1(x) is adopted as actual estimated value n(x) for the current noise level n only when the dynamic variations of the input signal x(k) undershoot a predeterminable threshold value $\in$, and thus when $$dx(i) \ldots dx(i-ts) < \in \tag{2}$$

This condition controls dynamic level fluctuations of the signal to be investigated. For example, with a value $\in$=12 dB, updating of the noise signal in the case of level fluctuations >12 dB is prevented. In this case the preceding estimated value is simply adopted unchanged for the current noise level n. This is the case for example when the background noise suddenly increases or decreases so that the speech level estimator must become active. Noise- or speech peaks can thus be prevented from erratically changing the estimated value n(x) in short time intervals.

The above described dynamic level fluctuations dx(i) can be determined for example from the difference between successive, consecutive short time mean values sam(i) in accordance with $$dx(i)=\mathrm{sam}(i)-\mathrm{sam}(i-1) \tag{3}$$

If the envelope curve of the entering input signals x(i) is now "stable", thus no speech signals are present with a probability bordering on certainty, the current level values can be directly assigned to the background noise. Otherwise, if the envelope curve "wobbles", speech, i.e. predominantly a useful signal, is present in the input signal x(i) with a high degree of probability, so that the peaks of the input signal cannot be used to estimate the noise background. In this case, as described above, a scaled noise value must then be obtained from the speech signal itself.

The drawing schematically illustrates this process, in particular the maximum formation from the input signal x(k), the scaling with a scaling factor S and the minimum formation to acquire the value n1(x), the adoption of this value as a function of a speech pause detector (SPD) whose output value is optionally scaled with an application-dependent factor D, and the threshold value estimation of the dynamic variations of the input signal x(k) which in the illustrated example are obtained from the change in the short time mean value dsam(x)/dt over time.

The resultant output signal of this process is then the desired updated estimated value n(x) for an actual noise level n.

What is claimed is:

1. A process for determining an estimated value for the noise level n of a background noise which is superimposed on an acoustic signal, transmitted over a telecommunications (=TC) system, comprising the steps of:

adopting a predeterminable initialisation value n0 as an estimated value n(x) for a current noise level n;

defining as a value n1(x) the estimated value n(x) of the noise level n for an input signal x(k), sampled at times k with a sampling frequency fs=1/T, n1(x) being determined by means of the minimum value of the quantity of all the successive maximum values of the input signal x(k) in each case found within a short time interval with a time length ts≧1 ms, adopting the value n1(x) as estimated value n(x) for the current noise level n when dynamic variations of the input signal x(k) undershoot a predeterminable threshold value ∈; and adopting unchanged the estimated value n(x) determined in the preceding step as new estimated value n(x) for the current noise level n when the dynamic variations of the input signal x(k) exceed a predeterminable threshold value ∈.

2. A process according to claim 1, wherein ts=1/fug, where fug is a lower limit frequency of the transmitting TC system.

3. A process according to claim 2, wherein fug≦500 Hz.

4. A process according to claim 1, further comprising selecting the maximum representable value of the destination system for the signal transmission within the TC system as initialisation value n0.

5. A process according to claim 1, further comprising setting for the determination of the estimated value n(x), the value n1(x) at a predeterminable lower limit value $n_{min}$ if a value n1(x)<$n_{min}$ is determined.

6. A process according to claim 1, further comprising setting for the determination of the estimated value n(x), the value n1(x) at a predeterminable upper limit value $n_{max}$ if a value n1(x)>$n_{max}$ is determined.

7. A process according to claim 1, wherein multiplying the maximum values, found within the short time intervals, of the input signal x(k), by a scaling factor S<1, enter into the determination of the value n1(x).

8. A process according to claim 1, further comprising changing a threshold value ∈=∈(x) adaptively with the roughness of the level of the input signal x(k).

9. A process according to claim 8, selecting a start value ∈0 =12 dB for the threshold value ∈(x) to be adaptively determined.

10. A process according to claim 1, wherein ts≧3 ms.

11. A process according to claim 3, wherein 10 Hz≦fug≦330 Hz.

* * * * *